(No Model.)
G. B. SCURI.
Velocipede.
No. 242,161.  Patented May 31, 1881.
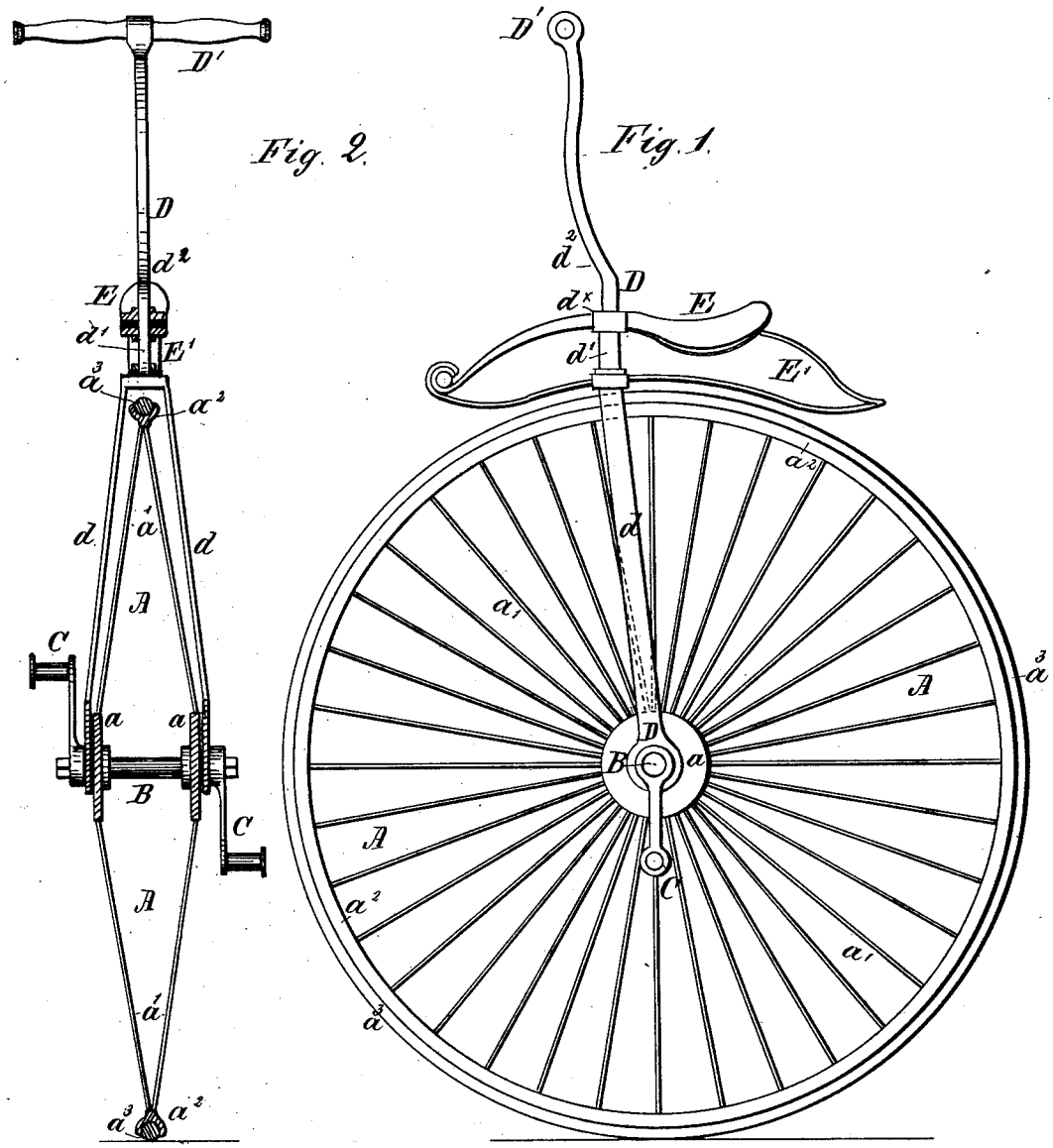

UNITED STATES PATENT OFFICE.

G. BATTISTA SCURI, OF TURIN, ITALY.

VELOCIPEDE.

SPECIFICATION forming part of Letters Patent No. 242,161, dated May 31, 1881.

Application filed April 7, 1881. (No model.)

*To all whom it may concern:*

Be it known that I, G. BATTISTA SCURI, a citizen of the Kingdom of Italy, residing at Turin, have invented new and useful Improvements in Velocipedes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in that class of velocipedes called "monocycles," in which but one wheel is employed, that serves both as a propelling and steering wheel; and it consists in the combination, with said wheel and its crank-axle, of a bifurcated steering-lever and a spring connected with said lever to support the driver's seat above the wheel.

The velocipedes which have heretofore been chiefly used are the bicycle and the tricycle, and to a limited extent the quadricycle, or four-wheeled velocipede, in all of which the support for the driver is so arranged as to practically throw his weight upon the front and rear wheel axes. The power required to propel these various species of conveyances increases proportionally with the number of wheels employed, and the relative diameters of the latter, as well as the mechanism employed for propelling and steering the same, together with the weight of the apparatus. It is obvious therefore that the power required to propel these conveyances diminishes proportionally with the number of the elements referred to. Consequently, to reduce this power to a minimum, it will only be necessary to correspondingly reduce the number of propelling-wheels, the propelling and steering mechanism, and the weight of the apparatus.

To obtain these results I employ but one wheel, of the diameter of those used in the ordinary bicycle, which wheel serves both as driving and steering wheel, and it does not differ in construction from those ordinarily used in bicycles.

In a monocycle that is constructed to support the entire weight of its driver, it is absolutely necessary that said weight, as well as that of the supports for the same and all other mechanism, either for propelling or steering, should be thrown upon the one wheel-axle and be adapted to be equally balanced thereon—otherwise it would not be possible for the driver to maintain his equilibrium—and this I accomplish by means of the arrangement of parts hereinafter described and shown in the accompanying drawings, in which—

Figure 1 is a side elevation, and Fig. 2 a vertical transverse section, of a monocycle constructed according to my invention.

A is the driving and steering wheel, constructed substantially like those of the usual bicycle—that is to say, it is composed of hub-plates $a$, from which radiate the wire spokes $a'$, a grooved metallic rim, $a^2$, and a rubber tire, $a^3$.

B is the wheel-axle, to which the wheel A is rigidly attached in the usual manner, said axle projecting outward on either side of the wheel, and has the crank-treadles C rigidly attached to its outer ends.

D is a bifurcated steering-lever, the arms $d\,d$ of which are loosely connected with the wheel-axle on opposite sides of the wheel A, while the arm $d'$ of the lever serves not only as a steering-lever, but also as a support for the spring E', to which the driver's seat E is secured. The upper end of the arm $d'$ of the lever D carries the usual lever-handles, D'. Thus it will be seen that the driver's seat and steering-lever are capable of rotation on the wheel-axle. In order to enable the driver to better maintain his equilibrium upon the wheel-axle, as well as to maintain a greater leverage for the purpose of steering, the arm $d'$ of the lever D is curved forward, as shown at $d^2$, whereby the driver is enabled to throw his weight forward and backward during propulsion to maintain his equilibrium, and to obtain a leverage at a point outside of the true center of gravity—that is to say, to enable him to apply power to the wheel-axle at a point beyond or outside of the fulcrum of the lever, which is here at $d^x$, or at the point that unites the lever with the driver's seat. Thus by slightly turning his body to one side or the other, and applying power in a like direction to the lever-handle, the wheel is turned to right or left, as the case may be, through the medium of the arms $d\,d$, which transmit the motion and power imparted to the lever-arm $d'$ to the wheel-axle B.

By means of this construction and arrangement I obtain a velocipede that can be propelled with comparatively little fatigue, and the cost of construction of which is reduced nearly one-half of that of the ordinary velocipede.

I am aware that monocycles are known in which the driver's seat is supported upon a rigid frame forming a part of the steering devices, and the latter as well the driver's weight counterbalanced upon the crank-axle by means of weights adjustably secured to extensions of said frame below the crank-axle; and I do not wish to claim, broadly, a monocycle having the driver's seat supported above the wheel, and to be propelled by cranks, in the usual manner.

Having now described my invention, what I claim is—

In a monocycle, the combination of the following elements, to wit: the driving-wheel and its crank-axle, the bifurcated steering-lever, the spring E', and the driver's seat E, supported thereby, all constructed, arranged, and operating substantially as described, for the purpose specified.

In witness that I claim the foregoing I have hereunto set my hand this 15th day of March, 1881.

SCURI (G. BATTISTA.)

Witnesses:
W. CORDON,
FRANCISCO ERTZO.